United States Patent [19]
Heederik et al.

[11] Patent Number: 6,025,070
[45] Date of Patent: Feb. 15, 2000

[54] ADHESIVE FILM

[75] Inventors: Peter Johannes Heederik, Re Leiden; Aren Joost De Man, MV Leiden; Frederick Everardus De Grunt, BM Zoetermeer, all of Netherlands

[73] Assignee: Avery Dennison Corporation, Pasadena, Calif.

[21] Appl. No.: 09/068,800

[22] PCT Filed: Nov. 14, 1996

[86] PCT No.: PCT/NL96/00447

§ 371 Date: May 14, 1998

§ 102(e) Date: May 14, 1998

[87] PCT Pub. No.: WO97/18275

PCT Pub. Date: May 22, 1997

[30] Foreign Application Priority Data

Nov. 15, 1995 [NL] Netherlands ............................ 1001657

[51] Int. Cl.⁷ ............................... C09J 7/02; B32B 7/12; B32B 27/00
[52] U.S. Cl. ...................... 428/343; 428/473.5; 528/170; 528/310; 528/322
[58] Field of Search .................................. 428/343, 473.5; 528/170, 322, 310

[56] References Cited

U.S. PATENT DOCUMENTS

| | | | |
|---|---|---|---|
| 3,993,815 | 11/1976 | Douek et al. | 428/40 |
| 5,415,903 | 5/1995 | Hoffman et al. | 428/15 |
| 5,506,310 | 4/1996 | Vasselin et al. | 525/426 |
| 5,680,653 | 10/1997 | Mathis et al. | 428/343 |
| 5,905,099 | 5/1999 | Everaerts et al. | 526/303.1 |

FOREIGN PATENT DOCUMENTS

| | | |
|---|---|---|
| 103407 | 3/1984 | European Pat. Off. . |
| 330272 | 8/1989 | European Pat. Off. . |
| 392847 | 10/1990 | European Pat. Off. . |
| 461966 | 12/1991 | European Pat. Off. . |
| 487171 | 5/1992 | European Pat. Off. . |
| 1458805 | 12/1976 | United Kingdom . |
| WO9222619 | 12/1992 | WIPO . |
| WO9322391 | 11/1993 | WIPO . |

*Primary Examiner*—P. Hampton-Hightower
*Attorney, Agent, or Firm*—Christie, Parker & Hale, LLP

[57] ABSTRACT

The present invention relates to an adhesive film which may be applied to several substrates, including plasticized polyvinyl chloride, such as canvas for trucks. The adhesive film according to the invention comprises at least a barrier layer and an adhesive layer, the barrier layer comprising a (co) polyamide. The adhesive film according to the invention may furthermore comprise a front layer, which is applied to the barrier layer. The barrier layer serves to prevent migration of components from the substrate, the front layer and the adhesive layer.

10 Claims, No Drawings

ADHESIVE FILM

The invention relates to an adhesive film which comprises at least:
1) a barrier layer and
2) an adhesive layer.

These films may further contain a front layer applied onto the barrier layer.

Adhesive films are generally used as pressure sensitive films to apply markings like decals, labels etc. on different kinds of substrates. Examples of these substrates are metals, glass, plastics, etc. A special type of the latter is vinyl coated canvas for trucks.

These adhesive films should meet a lot of requirements. In the case of soft polyvinyl chloride substrates for instance, which contain a lot of plasticizer, the film should have certain properties to prevent problems caused by the migration of plasticizer from the substrate into the film. If plasticizer from the substrate enters the film it may cause wrinkling and blistering of the film. Further the surface may become tacky and some edge-lifting may occur. The adhesive may also lose its adhesive power.

Irrespective of the kind of substrate used, problems may arise when components of ink layers migrate to the adhesive layer and substrate. Many of the adhesive films are in fact printed with inks dissolved in organic solvents. The solvents and other components may migrate through the upper layer (s) of the adhesive film to the adhesive layer, so that the adhesive properties undergo a temporary or permanent change.

The migration of components from the adhesive layer to the upper layer(s), such as low molecular substances like plasticizers, oils or tackifiers, can also give problems. Such low molecular substances are mainly present in adhesives which are applied by means of a hot-melt technique (that is application from the melt onto a release layer). Up to now the latter could not be used in combination with plastic films.

In the prior art these problems have been solved by using films which consist of a plurality of layers, in which one layer has been incorporated which forms a barrier to the migration of certain components.

Thus European patent application 103407 describes an adhesive film suitable for adhesion to a polyvinyl substrate containing a large amount of plasticizer. This film comprises a first layer of polyvinyl chloride, a second layer of a plasticizer resistant pressure-sensitive adhesive and a third layer between the first and second layer which acts as a barrier for plasticizer from the substrate.

The third layer inhibits the migration of plasticizer from the substrate and has a good flexibility, good adhesion and a good resistance to chemical cleaning agents. The third layer preferably comprises an aliphatic polyurethane resin. Other materials which could be used for this layer are not mentioned.

International patent application WO 92/22619 describes an adhesive flexible film, comprising
1) a transparent upper layer having an elastic elongation of at least 120%,
2) a polymeric film having an elastic elongation of at least 120% and
3) an adhesive layer.

As suitable materials for the polymer film elastomers and especially an elastomeric urethane are mentioned. The polymer film preferably has plasticizer migration inhibiting properties. Between the various layers (other) barrier layers may be present, the composition of which is not further indicated.

This does not provide a satisfactory solution for the afore mentioned problems, which occur as a result of migration of plasticizer and like components.

In the prior art other materials for use as barrier layers are known, such as polyethylene, polypropylene, polyethylene terephthalate, etc. However, adhesion of these materials to an upper layer is often a problem. in some cases it is already impossible to obtain proper adhesion between the upper layer and the barrier layer during manufacture. In other cases problems may only appear during use, in the form of delamination of the upper layer and the polymeric barrier layer.

It has now been found that all above mentioned problems may be solved by using a barrier layer comprising a (co) polyamide.

The present invention has the advantage that the (co) polyamide has excellent barrier properties so that the above mentioned problems no longer occur. Moreover the (co) polyamide according to the invention has the advantage that the (co)polyamide layer itself can be used as a front layer and can be printed or coloured, so that no separate front layer is required.

The use of the (co)polyamide layer in the adhesive film also provides it with a good fuel resistance, which may be useful for some applications of the film.

The invention relates to an adhesive film comprising at least:
1) a barrier layer and
2) an adhesive layer,
characterized in that the barrier layer comprises a (co) polyamide. According to another aspect of the invention the adhesive film additionally comprises a front layer applied onto the barrier layer.

With "barrier layer" is meant that hardly or no components from other layers of the adhesive film or from the substrate penetrate the layer.

The (co)polyamides suitable for the invention comprise conventional polyamides, such as e.g. nylon 6 and nylon 6,6 as well as copolymers of standard polyamide monomers with other monomers. Blends of two or more polyamides are also possible.

Copolymers of standard polyamide monomers with other monomers are known. The copolymerisation causes reduction of the melting point and broadens the range in which the polyamide may be melt processed. It reduces the crystallinity and consequently also the density and rigidity and increases the solubility.

The (co)polyamide is preferably based on caprolactam, laurolactam and hexamethylenediamine adipate, as well as other polyamide forming compounds like for instance piperazine dicarboxylic acid combinations.

The other polyamide forming ingredients may be selected from 11-amino-undecanoic acid and/or the salts of hexamethylenediamine with adipic, azelaic, sebacic dodecanedicarboxylic and/or undecanedicarboxylic acid.

According to another aspect of the invention the (co) polyamide has plasticizer migration inhibiting properties. With "plasticizer migration inhibiting properties" is meant that upon ageing of the film according to the invention adhered to plasticized polyvinyl chloride, such as tarpaulin and truck curtains, at 70° C. for three weeks no wrinkling and blistering, edge-lifting or shrinkage appears.

For suitable application with the present invention the (co)polyamide preferably has the properties that its flexibility is comparable with that of a plasticized polyvinyl chloride substrate, such as tarpaulin and truck curtains and that it does not crack at temperatures as low as −20° C.

The barrier layer comprising the (co)polyamide, effectively has a thickness of from 1 to 250 μm, preferably from 1 to 60 μm.

In addition to (co)polyamide the barrier layer may also contain other polymers. Thermoplastic polymers which can be used are those which form a single phase with the (co)polyamide, which is expressed in a single Tg and/or may be dispersed in the (co)polyamide phase and form individual particles therein having a maximum particle size of 100 μm and/or form a separate phase in the (co)polyamide phase.

Examples thereof are plasticizers for polyamides, acrylates, ethylene vinylacetate, polyvinyl alcohol, PVC copolymers, other (co)polyamides and polyethers, such as polytetramethyleneoxide and polypropyleneoxide, which are used in (co)polyamide based thermoplastic elastomers.

The barrier layer may be coloured with conventional commercially available colorants.

The adhesive film according to the invention comprises, in addition to the barrier layer, an adhesive layer and optionally a front layer.

The adhesive layer may comprise all usual types of adhesives, such as acrylate based adhesives, natural rubber based adhesives, synthetic rubber based adhesives, such as polystyrene polybutadiene (SBR), ethylene vinyl acetates (EVA), synthetic rubber adhesives based on block copolymers, such as polystyrene polybutadiene polystyrene (SBS) and polystyrene polyisoprene polystyrene (SIS), vinyl ether based adhesives, silicon based adhesives, polyurethane based adhesives, chlorinated adhesives, etc.

A number of such adhesives is for example described in European patent applications 103407 and 487171.

The adhesives may also contain conventional additives such as tackifiers, plasticizers, cross-linkers, stabilizers, pigments and fillers.

The adhesive is applied in an amount of from 5 to 80 g/m$^2$, preferably from 20 to 60 g/m$^2$.

The front layer may comprise different materials, e.g. flexible polymer materials and paper. Suitable polymers are inter alia polyurethanes, polyethylene, polypropylene, polyesters, polyether esters, polyacrylates, polystyrene, mixtures of polyurethanes with PVC, etc. A PVC-film is preferred.

The front layer may also contain additives known in the art, such as fillers, plasticizers (both monomeric and polymeric) and stabilizers. It may be coloured with various conventional pigments but it may also be transparent.

The thickness of the final front layer is in general comprised between 1 and 250 μm, preferably between 1 and 100 μm.

The front layer and the barrier layer may be manufactured with different processes, e.g. by means of a casting process, calendering or by (co)extrusion. The choice of a certain production process strongly depends on the one hand on the properties of the raw materials, which are used for the film and on the other hand on the desired thickness of the film.

The adhesive may be applied by various methods:
application of an adhesive system in an organic solvent or water,
application by means of the above described hot-melt technique,
application by (co)extrusion,
application as high solid and curing by means of UV radiation, an electron beam or heat.

The adhesive films are preferably manufactured as follows. If present, first a front layer is manufactured. For this a polymer is used, in general PVC, which is dispersed in a suitable organic medium. Stabilizers, plasticizers, fillers, colorants and other additives may be added to the dispersion. The dispersion is applied to a release layer by means of techniques known in the art. In a ventilated oven the solvent is evaporated, whereby a film with the desired thickness is obtained.

Subsequently the barrier layer is applied. For this a (co)polyamide dissolved or dispersed in a suitable organic medium is used. Stabilizers, plasticizers fillers, colorants and other substances may be added to the solution or dispersion.

The solution or dispersion is applied to the front layer by means of techniques known in the art. if no front layer is used the solution or dispersion is applied onto a release layer. In a ventilated oven the solvent is evaporated, whereby a barrier layer with the desired thickness is obtained.

Next an adhesive layer is applied to the film consisting of the barrier layer and optionally the front layer. This is performed by applying an adhesive in an organic solvent or water to a release layer by a technique known in the art. The organic solvent or the water is evaporated in a ventilated oven, so that an adhesive layer with the desired thickness is obtained.

Immediately after drying the film containing the barrier layer, and optionally, the front layer is laminated against the adhesive layer. It is also possible to start with applying the adhesive layer to the barrier layer, followed by drying and subsequently laminating the release layer on said film.

After laminating, the release layer, on which the barrier layer or front layer is casted, is removed.

If desired the manufactured film may be provided with one or more additional top layers. This for example prevents the attachment of dirt or improves the adhesion of ink. All top layers which are known in the art, such as acrylate, polyurethane coatings, etc. are considered. The top layer is applied with a conventional technique onto the front layer, or if no front layer is present, onto the barrier layer of the film.

The thickness of the top layer is from 1 to 20 μm, preferably from 2 to 6 μm.

EXAMPLES

In the following examples an adhesive film according to the invention is manufactured and tested. For comparison the film is manufactured with commercially available thermoplastic polymers instead of (co)polyamides.

Manufacture of the Film

Examples 1 to 15

The adhesive film was manufactured as follows. First the layer based on the thermoplastic polymer was manufactured. For this purpose the selected thermoplast was dissolved in a suitable solvent. Thermoplastic polymers which could not be dissolved were dispersed. The thermoplastic polymers used and their solvents are shown in Table I.

Next the solution or dispersion was applied onto a standard cast-film, which was based on polymer plasticized PVC. The thermoplastic polymer dissolved or dispersed in a suitable solvent was applied to the PVC by means of a Werner Mathis AG coating apparatus.

The obtained film was dried in a ventilated oven at 160° C. for 1 minute after 1 minute of pre-drying at 40° C. The layers in which the thermoplastic polymer was present in dispersed form, were dried at 190° C. This high temperature is required to fuse the dispersed particles after evaporation of the solvent. The layer thickness was 10 μm.

Next an adhesive film was applied to the PVC-film with the barrier layer by laminating the film with a barrier adhesive with an adhesive weight of 50 g/m². The adhesive was based on the adhesive described in European patent application 487171 and contained:

70% by weight of EVA (ethylene vinylacetate) having a vinyl acetate content of 50% by weight 20% by weight of VROH (vinylchloride/vinylacetate/hydroxyalkylacrylate)

10% by weight of DOP (dioctylphthalate).

For applying the adhesive a so-called transfer tape was used which comprises a release layer with adhesive and a second release layer. One of the release layers was removed, whereafter the open adhesive side was laminated against the barrier layer.

TABLE I

| Ex. | Chemical composition | Type | Solvent system |
|---|---|---|---|
| 1 | aliphatic polyurethane | Uraflex EU103M1[1] | IPA/toluene |
| 2 | ethylene vinylacetate containing 18% vinylacetate | Coathylene CL-3795[2] | toluene (dispersed) |
| 3 | low density polyethylene | Coathylene HX-2578[2] | toluene (dispersed) |
| 4 | high density polyethylene | Coathylene NB-6454[2] | toluene (dispersed) |
| 5 | polypropylene | Coathylene PB-0580[2] | toluene (dispersed) |
| 6 | ethylene/acrylic acid/acrylic acid ester | Coathylene TB-2957[2] | toluene (dispersed) |
| 7 | ethylene/acrylic acid ester/-maleic acid anhydride | Coathylene TB-3580[2] | toluene (dispersed) |
| 8 | vinylchloride/vinylacetate/hydroxyalkylacrylate | Ucar VROH[3] | MEK/toluene |
| 9 | vinylchloride/vinylacetate | Ucar VYHH[3] | MEK/toluene |
| 10 | vinylchloride/vinylacetate | Ucar VYLF[3] | MEK/toluene |
| 11 | vinylchloride/vinylacetate | Ucar VYNS[3] | MEK/toluene |
| 12 | copolyamide | Platamid M 1276[4] | ethanol/water (6/1) |
| 13 | copolyamide | Vestamelt X7077[5] | IPA/water/chloroform |
| 14 | copolyamide + ethylene vinylacetate containing 70% vinylacetate (1:1) | Platamid M 1276[4] + Levapren 700[6] | toluene/IPA/water |
| 15 | copolyamide + vinylchloride/vinylacetate/hydroxyalkylacrylate (1.1) | Platamid M 1276[4] + Ucar VROH[3] | toluene/MEK/IPA/water |

[1]Obtainable from DSM
[2]Obtainable from Plast-Labor SA
[3]Obtainable from Union Carbide
[4]Obtainable from Elf Atochem
[5]Obtainable from Huls
[6]Obtainable from Bayer Examples 16 to 19

Further adhesive films were manufactured with (co)polyamides which could neither be dissolved nor dispersed. These films were extruded. The extruded film was prepared with a Collin E 25 laboratory 6 zone heated extruder with a 25 mm standard screw.

The composition of these films is shown in Table II.

TABLE II

| Ex. | Chemical composition | Type |
|---|---|---|
| 16 | caprolactam-dodecanelactam copolymer | Grilon CR 9[1] |
| 17 | caprolactam-hexamethylenediamine-nonanedioic acid based copolymer | Grilon CF 62 BSE[1] |
| 18 | hexamethylenediamine-sebacic acid copolymer | Ultramid S3[2] |
| 19 | polyamide-polyether block copolymer | Pebax 7033[3] |

[1]Obtainable from EMS
[2]Obtainable from BASF
[3]Obtainable from Elf Atochem

The extrusion settings are shown in Table III.

TABLE III

| Settings | Ex. 16 | Ex.17 | Ex.18 | Ex.19 |
|---|---|---|---|---|
| Zone temperatures (°C.) | 210 | 180 | 200 | 200 |
|  | 225 | 185 | 235 | 215 |
|  | 230 | 200 | 250 | 220 |
|  | 240 | 210 | 260 | 230 |
|  | 250 | 225 | 270 | 240 |
|  | 250 | 230 | 260 | 245 |
| Screw speed (rpm) | 25 | 25 | 20 | 25 |
| Pressure (bar) | 36 | 41 | 60 | 16 |
| Melt temperature (°C.) | 244 | 240 | 272 | 252 |
| Film speed (m/min) | 3.1 | 1.5 | 2.4 | 2.5 |
| Chill roll temp. (°C.) | 35 | 20 | 20 | 17 |
| Pre-dry temperature (°C.) | 80 | — | 100 | 70 |
| Film thickness (μm) | 80 | 80 | 80 | 80 |

The adhesive layer was applied onto these extruded films according to the method described above for examples 1 to 15. With these adhesive films no cast-film was used.

Test Methods

Adhesion Test of Barrier Layer on PVC Film

The "tape-test" was used to check whether the applied barrier layer properly adhered to the PVC-film. For this purpose a film without adhesive layer was manufactured. Two hours after the barrier layer was applied to the PVC an adhesive tape (Tesafilm 4154) was adhered to the layer. After one minute the tape was pulled off firmly at an angle of 30° in the machine direction. Thereafter it was checked whether the layer had come off of the PVC. The results are shown in Table IV, wherein pos. stands for a positive result and neg. for a negative result, that is to say that the barrier layer had come off of the PVC.

Ageing of Adhesive Film on Polyvinylchloride Coated Canvas

This test was used to examine to what extent the adhesive film remains stable after adhering it on a substrate containing plasticizer. As a substrate a tarpaulin was used which is usually employed for protection of cargo on trucks and which consists of plasticized polyvinyl chloride, reinforced with a woven fabric [Van Besouw BV, plastics, Goirle; type 55].

For this test an adhesive film having a length of 8 cm and a width of 8 cm was applied to the canvas by a roller. After 24 hours of conditioning at room temperature the canvas with the film applied thereon was placed in an oven with a temperature of 70° C.

After three weeks the film was judged for:

shrinkage or expansion wrinkling or blistering edge-lifting
surface tackiness of the film
The results are judged as follows:
0=good
1=reasonable
2=moderate
3=poor
4=very poor A negative number with shrinkage means expansion instead of shrinkage. The judgement remains the same.

The results are shown in Table IV.

TABLE IV

| Ex. | Tape-test | Wrinkling | Edge-lifting | Shrinkage | Tackiness |
|---|---|---|---|---|---|
| 1 | pos. | 1 | 1 | 0 | 2 |
| 2 | neg. | n.t.[1] | n.t. | n.t. | n.t. |
| 3 | neg. | n.t. | n.t. | n.t. | n.t. |
| 4 | neg. | n.t. | n.t. | n.t. | n.t. |
| 5 | neg. | n.t. | n.t. | n.t. | n.t. |
| 6 | pos. | 1 | 4 | −3 | 4 |
| 7 | pos. | 1 | 4 | −4 | 4 |
| 8 | pos. | 4 | 2 | 0 | 3 |
| 9 | pos. | 2 | 2 | 0 | 4 |
| 10 | pos. | 3 | 2 | −1 | 3 |
| 11 | pos. | 2 | 2 | −1 | 2 |
| 12 | pos. | 0 | 0 | 0 | 0 |
| 13 | pos. | 0 | 0 | 0 | 0 |
| 14 | pos. | 0 | 0 | 0 | 0 |
| 15 | pos. | 2 | 2 | 0 | 0 |
| 16 | n.a. | 0 | 1 | 0 | 0 |
| 17 | n.a. | 0 | 0 | 1 | 0 |
| 18 | n.a. | 0 | 0 | 1 | 0 |
| 19 | n.a. | 0 | 0 | 0 | 0 |
| Ref.[2] | n.a. | 3 | 2 | −1 | 3 |

[1] The thermoplastic polymers which gave a negative result in the tape test were not further tested.
[2] The reference consisted of the standard cast-film with an adhesive layer but without a barrier layer thereon.

Adhesion Properties after Printing and Petrol Immersion

Adhesive films were manufactured according to the method described above for examples 1 to 15, only as an adhesive a standard hexyl acrylate adhesive was used with a coating weight of 32.5 g/m². The thickness of the layers was as follows:

| PVC film | 50 μm |
|---|---|
| Barrier layer | 15 μm |

The barrier layer consisted of Platamid M1276 (for composition see Table I).

Adhesion Properties after Printing

The adhesive films described above were printed with four alayers of Sericol Trichromatic MattPlast MH ink. Next they were applied onto a substrate consisting of a polyester painted aluminum panel (Akzo coatings TS Medium Solids Polyester 071900).

To test the adhesion properties a 180° Peel adhesion test was performed. This test was carried out according to FINAT (Fédération internationale des fabricants transformateurs d'adhésifs et thermocollants sur papiers et autres supports) Test Method no. 1.

For this purpose samples of the adhesive films having a length of 150 mm and a with of 25 mm were used. The samples were removed from the substrate at an angle of 180° and at a speed of 300 mm/minute with the aid of a tensile testing machine at a temperature of 23±2° C. The peel adhesion was measured after dwell times of 20 minutes and 24 hours and is indicated in N/25 mm. The results are shown in Table V.

TABLE V

| | 180° Peel adhesion (N/25 mm) | |
|---|---|---|
| Film | Dwell time 20 minutes | Dwell time 24 hours |
| PVC film | 9.9 | 11.3 |
| Printed PVC film | 6.7 | 6.3 |
| Printed PVC film + barrier layer | 11.8 | 12.4 |

Adhesion Properties after Petrol Immersion

Adhesive films were manufactured according to the method described above for example 12 and 19, only as an adhesive a standard hexyl acrylate adhesive was used with a coating weight of 32.5 g/m². The barrier layer thus consisted of Platamid M1276 or Pebax 7033.

After a dwell time of 24 hours the films were immersed in a ASTM-B test fluid for one hour. The test fluid consisted of toluene/iso-octane (30/70 vol/vol). After 30 minutes recovery a 180° Peel adhesion test was carried out. The lifting of the edges during immersion due to the aggressive fluid was also measured. The results are shown in Table VI.

TABLE VI

| Film | 180° Peel adhesion (N/25 mm) | Edgelifting (mm) |
|---|---|---|
| PVC | 2.9 | 1.0 |
| PVC + Platamid M1276 | 15.0 | 1.5 |
| PVC + Pebax 7033 | 20.3 | 0.5 |

Adhesion Properties when using an Oil Containing Adhesive

This test shows that the barrier layer prevents migration of oil from the adhesive to the front layer. For this test a Quick-Stick measurement was used (FINAT test method no. 9).

The two ends of a 25 mm×175 mm sample, of which the protective backing paper has been removed, were clamped in the upper jaw of a tensile tester, leaving the loop hanging vertically downwards. A glass plate was clamped in the lower jaw.

A measurement was started by a downward movement of the loop at a speed of 300 mm/min. At full glass sample contact the test speed was reversed until the sample is entirely separated from the glass plate. The test temperature was 23±2° C. The maximum force is reported in N/25 mm.

The adhesive films tested were manufactured according to the method described above, only as an adhesive a tackified polystyrene polybutadiene rubber based adhesive, which contains 20% of a naphtenic oil was used with a coating weight of 37 g/m². The thickness of the layers was as follows:

| PVC film | 50 μm |
|---|---|
| Barrier layer | 8 μm |

The barrier layer consisted of Platamid M1276.

To determine the effect of oil migration the test samples were artificially aged for 5 days at 70° C.

TABLE VII

| Film | Quick-Stick glass (N/25 mm) |
| --- | --- |
| PVC film fresh | 16.1 |
| PVC film aged | 12.0 |
| PVC film + barrier layer fresh | 16.8 |
| PVC film + barrier layer aged | 15.1 |

We claim:

1. An adhesive film comprising at least:

1) a barrier layer comprising a (co)polyamide, and
2) an adhesive layer in direct contact with the barrier layer.

2. An adhesive film according to claim 1, wherein the (co)polyamide has plasticizer migration inhibiting properties.

3. An adhesive film according to claim 1, further comprising a front layer applied to the barrier layer.

4. An adhesive film according to claim 1, wherein the (co)polyamide layer is colored.

5. An adhesive film according to claim 1, wherein the barrier layer has a thickness of 1 to 250 $\mu$m.

6. An adhesive film according to claim 1, wherein the barrier layer has a thickness of 1 to 60 $\mu$m.

7. An adhesive film according to claim 1, wherein the barrier layer further comprises one or more flexible polymers.

8. An adhesive film according to claim 1, wherein the (co)polyamide comprises at least one composition selected from the group consisting of nylon 6 and nylon 6,6.

9. An adhesive film according to claim 1, wherein the (co)polyamide is based on at least one composition selected from the group consisting of caprolactam, laurolactam, and hexamethylenediamine adipate.

10. An adhesive film according to claim 1, wherein the (co)polyamide is based on hexamethylenediamine nononedioic acid or hexamethylenediamine sebacic acid.

* * * * *